UNITED STATES PATENT OFFICE.

WALTER EDWIN WINDSOR-RICHARDS, OF LONDON, ENGLAND.

MANUFACTURE OF INDIA-RUBBER GOODS.

1,069,508.

Specification of Letters Patent.     Patented Aug. 5, 1913.

No Drawing.     Application filed April 10, 1913. Serial No. 760,289.

*To all whom it may concern:*

Be it known that I, WALTER EDWIN WINDSOR-RICHARDS, a subject of the King of England, and resident of London, England, have invented certain new and useful Improvements in and Relating to the Manufacture of India-Rubber Goods, of which the following is a specification.

This invention relates to improvements in and relating to the manufacture of india-rubber goods, the object being to provide a process for manufacturing india-rubber goods having cellulose dissolved in it. The inventor has discovered that india-rubber, whether new or waste, acts as a solvent on material of a cellulose nature such as hemp, cotton etc. The change taking place in the cellulose is most marked. If a mixture consisting of waste cellulose and Pará rubber or waste rubber or say equal parts rubber and cellulose, be heated in any suitable mixer a gradual change takes place. When the temperature reaches about 200 cent. the whole becomes a sticky plastic mass and no trace of cellulose is now observable. That the cellulose has not been destroyed is evident from the fact that there is little or no loss in weight after the treatment, nor does the material contain any free carbon, such as is obtained when cellulose or similar material is subjected to a high heat alone. Also, when the mass is dissolved in benzol or other solvent, no trace of cellulose can be detected. That this solution of the cellulose is not caused by any chemical reaction due to chemicals in a reclaimed rubber or a treated cellulose waste is shown by the fact that a better product if possible is obtained by using virgin rubber and a pure cellulose. An exact statement as to the reaction between the rubber and the cellulose is not possible at this stage, but the opinion may be advanced that one or more of the oils of rubber (probably isoprene) acts in the manner of a solvent on the cellulose at a suitable temperature. The plastic mass thus obtained is capable of being worked and vulcanized by addition of sulfur by any of the well known methods employed in manufacturing rubber goods. To the mass can also be added fillers for toughening etc. such as asbestos ground leather, or further waste or new rubber, chalk, pitch resin etc. etc. and other ingredients used in the trade. The mass vulcanizes like any ordinary rubber mixture and can be made hard or soft at will depending on the amount of sulfur and other vulcanizing agents employed, length of time in the heat, and temperature of same.

Having now fully described my said invention, what I claim and desire to secure by Letters Patent, is:

1. A process for dissolving cellulose in india-rubber consisting in heating in any suitable mixer a mixture of india-rubber and cellulose, substantially as and for the purpose set forth.

2. A process for dissolving cellulose in india-rubber consisting in treating in any suitable mixer a mixture of india-rubber and cellulose to a temperature of about 200° C. substantially as and for the purpose set forth.

3. A process for manufacturing india-rubber goods containing cellulose dissolved in the rubber consisting in heating in any suitable mixer a mixture of india-rubber and cellulose and vulcanizing the mixture obtained, substantially as and for the purpose set forth.

4. A process for manufacturing india-rubber goods containing cellulose dissolved in the rubber consisting in heating in any suitable mixer, a mixture of india-rubber and cellulose adding fillers and vulcanizing the mass obtained, substantially as and for the purpose set forth.

5. A process for manufacturing india-rubber goods containing cellulose dissolved in the rubber consisting in heating in any suitable mixer a mixture of waste india-rubber and cellulose and vulcanizing the mixture obtained, substantially as and for the purpose set forth.

6. A process for manufacturing india-rubber goods containing cellulose dissolved in the rubber, consisting in mixing in any suitable mixer a mixture of waste india-rubber and cellulose, adding fillers and vulcanizing the mass obtained substantially as and for the purpose set forth.

In testimony whereof I have hereunto set my hand in presence of two witnesses.

WALTER EDWIN WINDSOR-RICHARDS.

Witnesses:
O. J. WORTH,
W. E. ROGERS.